(12) United States Patent
Taniuchi et al.

(10) Patent No.: US 9,503,670 B2
(45) Date of Patent: Nov. 22, 2016

(54) ELECTRONIC APPARATUS AND DISPLAY CONTROL METHOD

(71) Applicant: KABUSHIKI KAISHA TOSHIBA, Minato-ku, Tokyo (JP)

(72) Inventors: Kenichi Taniuchi, Yokohama Kanagawa (JP); Kazuhiko Kashiwagi, Tokorozawa Saitama (JP); Akira Kumagai, Ome Tokyo (JP); Yuuichiro Aso, Hamura Tokyo (JP); Hirokazu Kato, Akishima Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/508,181

(22) Filed: Oct. 7, 2014

(65) Prior Publication Data
US 2015/0156443 A1  Jun. 4, 2015

(30) Foreign Application Priority Data
Nov. 29, 2013  (JP) .................. 2013-247188

(51) Int. Cl.
| | | |
|---|---|---|
| *H04N 5/44* | (2011.01) | |
| *H04N 5/445* | (2011.01) | |
| *H04N 21/485* | (2011.01) | |
| *H04N 21/81* | (2011.01) | |
| *H04N 21/431* | (2011.01) | |
| *H04N 21/4728* | (2011.01) | |
| *H04N 21/6547* | (2011.01) | |
| *H04N 21/6587* | (2011.01) | |
| *H04N 21/422* | (2011.01) | |
| *H04N 21/478* | (2011.01) | |

(52) U.S. Cl.
CPC ........ *H04N 5/44513* (2013.01); *H04N 5/4403* (2013.01); *H04N 5/44582* (2013.01); *H04N 5/44591* (2013.01); *H04N 21/4314* (2013.01); *H04N 21/4728* (2013.01); *H04N 21/4858* (2013.01); *H04N 21/6547* (2013.01); *H04N 21/6587* (2013.01); *H04N 21/812* (2013.01); *H04N 21/8173* (2013.01); *H04N 21/8186* (2013.01); *H04N 21/4221* (2013.01); *H04N 21/42218* (2013.01); *H04N 21/47815* (2013.01); *H04N 2005/4414* (2013.01); *H04N 2005/44521* (2013.01)

(58) Field of Classification Search
CPC .... H04N 5/45; H04N 5/44591; H04N 5/445; H04N 5/2628
USPC ....................................... 348/561
See application file for complete search history.

(56) References Cited

U.S. PATENT DOCUMENTS

| | | | |
|---|---|---|---|
| 6,456,334 B1 * | 9/2002 | Duhault | H04N 5/45 348/564 |
| 6,538,670 B1 * | 3/2003 | Kido | G06F 3/0489 715/763 |
| 2004/0223731 A1 * | 11/2004 | Ozawa | G09G 5/00 386/230 |

(Continued)

FOREIGN PATENT DOCUMENTS

| | | |
|---|---|---|
| JP | 09-128451 | 5/1997 |
| JP | 2012-134836 | 7/2012 |

*Primary Examiner* — Michael Lee
(74) *Attorney, Agent, or Firm* — Knobbe, Martens, Olson & Bear LLP

(57) ABSTRACT

According to one embodiment, an electronic apparatus includes a data receiver, processing circuitry and an operation information receiver. The data receiver receives first data for displaying an image. The processing circuitry displays, using the first data, the image on a screen of a display. The operation information receiver receives operation information indicating that one of a plurality of buttons provided at a remote control is pressed. The processing circuitry displays, based on the operation information, an enlarged image of a first area of a plurality of divided areas of the image on the screen.

8 Claims, 11 Drawing Sheets

(56) References Cited

U.S. PATENT DOCUMENTS

2007/0050810 A1* 3/2007 Imaizumi .......... H04N 5/44591
          725/37
2007/0132720 A1* 6/2007 Kang ........................ G06F 3/14
          345/156
2008/0098430 A1* 4/2008 Kim ....................... H04N 5/445
          725/44

* cited by examiner

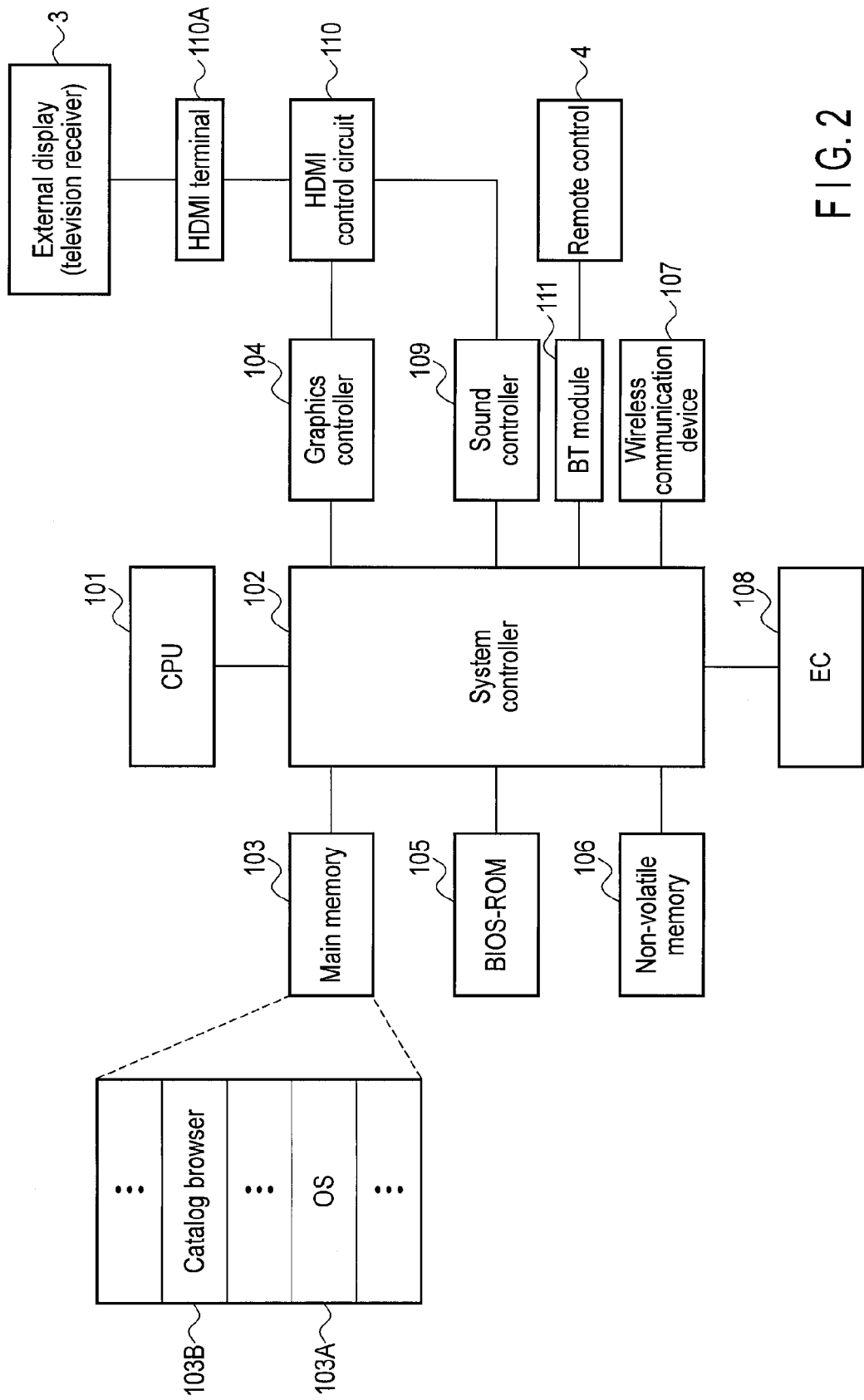
F I G. 2

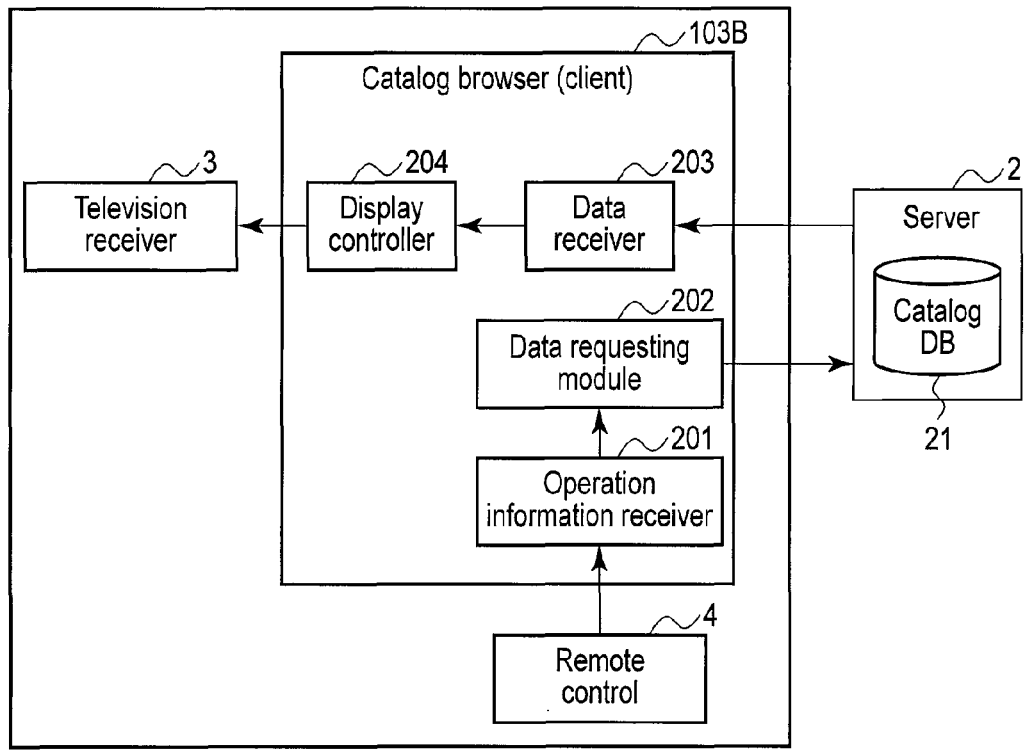
F I G. 3
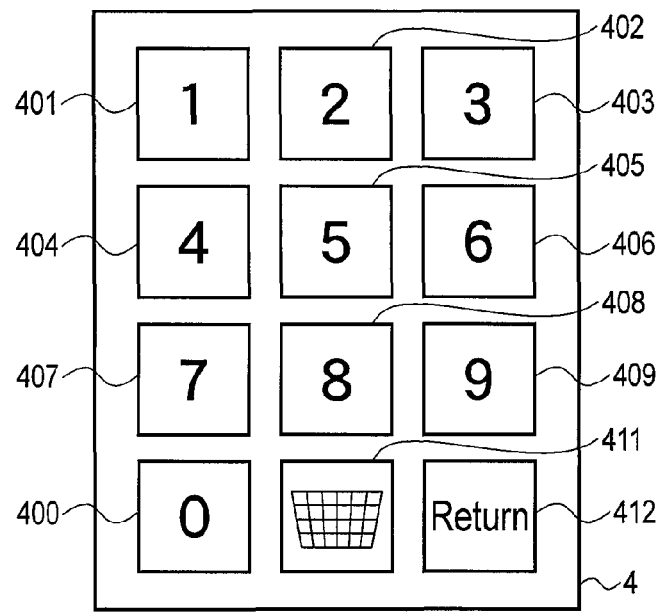
F I G. 4

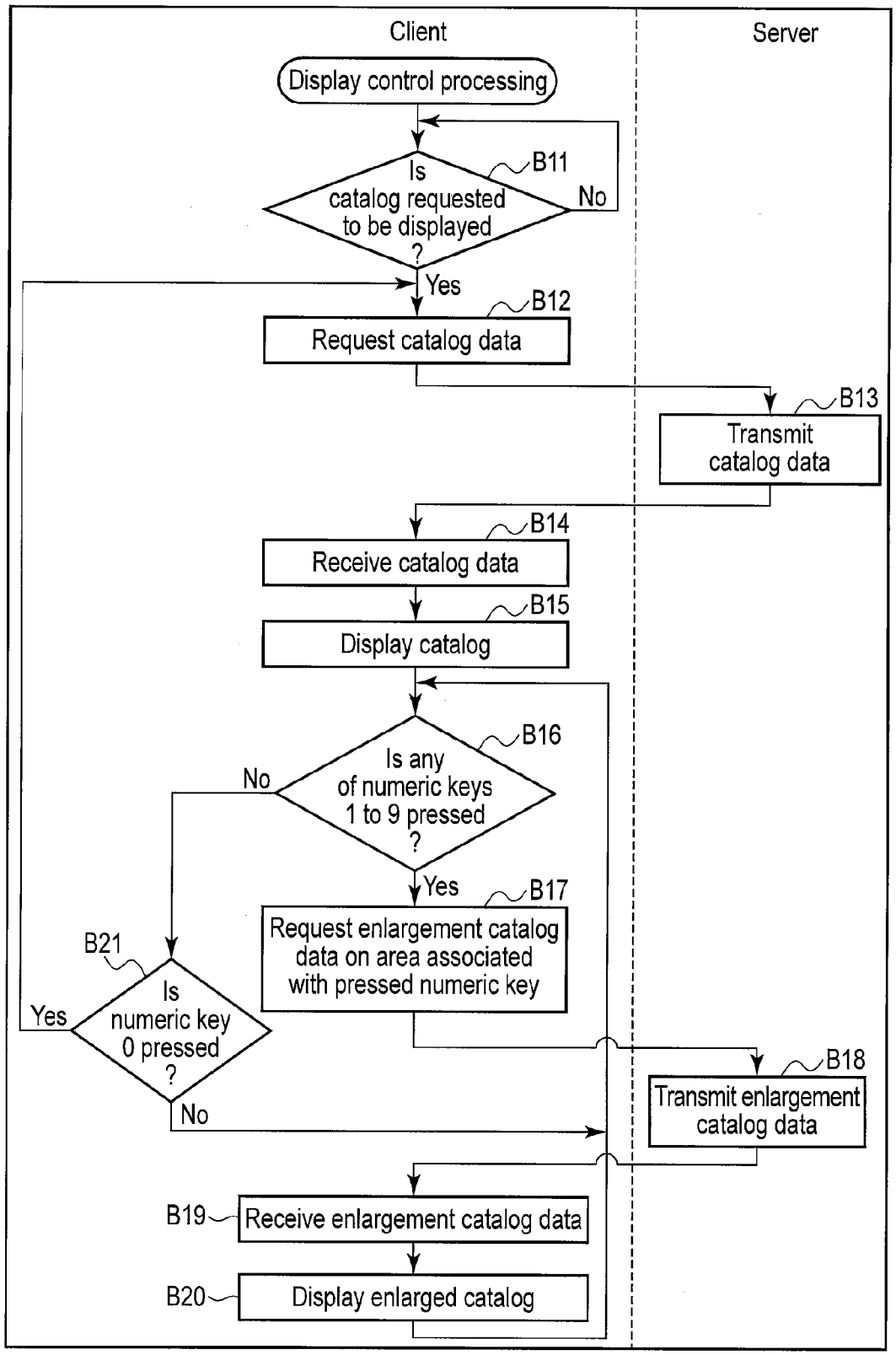
F I G. 14

ELECTRONIC APPARATUS AND DISPLAY CONTROL METHOD

CROSS-REFERENCE TO RELATED APPLICATIONS

This application is based upon and claims the benefit of priority from Japanese Patent Application No. 2013-247188, filed Nov. 29, 2013, the entire contents of which are incorporated herein by reference.

FIELD

Embodiments described herein relate generally to an electronic apparatus and a display control method applied to the electronic apparatus.

BACKGROUND

Web shopping using an on-line catalog is widespread. In most cases, such web shopping uses a notebook-type personal computer, a tablet computer, a smart phone or the like. On the other hand, web shopping using a television receiver is also proposed. For example, it is possible to promote web shopping by users who are unaccustomed to operation of computers, by providing on-line catalogs through television receivers.

In the case where a catalog, an advertising bill or the like is displayed on a screen of a television receiver, a user uses a remote control to perform an operation regarding an interesting commodity in the catalog, advertising bill or the like.

However, in the operation using the remote control, it may be troublesome to specify an area to be operated in an image displayed on the screen (for example, a button for purchasing a commodity, a button for giving an instruction to have an image of a commodity enlargedly displayed, or the like).

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing an example of a system configuration of the electronic apparatus of the embodiment.

FIG. 3 is a block diagram showing an example of a functional configuration of a catalog browser executed by the electronic apparatus of the embodiment.

FIG. 4 is a view showing an example of an appearance of a remote control for operating the electronic apparatus of the embodiment.

FIG. 14 is a flowchart showing an example of the procedure of display control processing executed by the electronic apparatus of the embodiment.

DETAILED DESCRIPTION

Various embodiments will be described hereinafter with reference to the accompanying drawings.

In general, according to one embodiment, an electronic apparatus includes a data receiver, processing circuitry and an operation information receiver. The data receiver receives first data for displaying an image. The processing circuitry displays, using the first data, the image on a screen of a display. The operation information receiver receives operation information indicating that one of a plurality of buttons provided at a remote control is pressed. The processing circuitry displays, based on the operation information, an enlarged image of a first area of a plurality of divided areas of the image on the screen.

Figure 1:
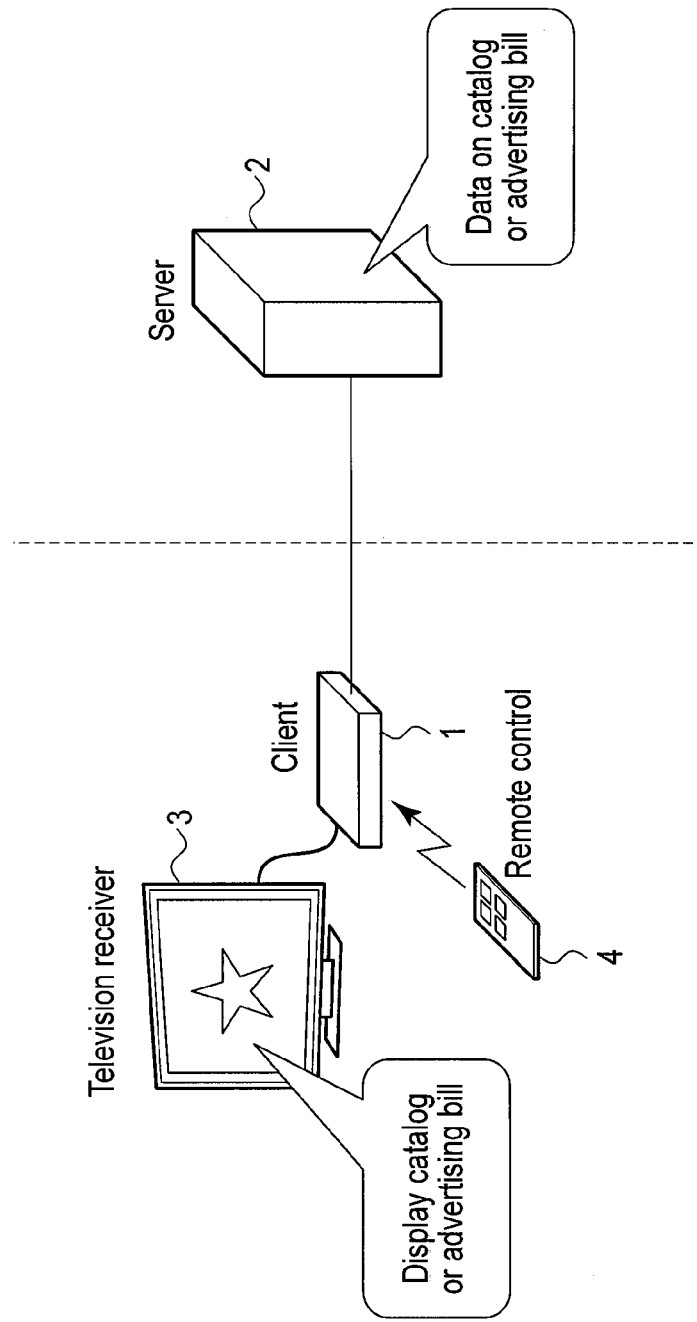
FIG. 1 is an exemplary conceptual diagram for explaining a system for displaying a catalog, which is acquired from a server apparatus, on a screen of a television receiver by an electronic apparatus (client apparatus) according to an embodiment.

First of all, with reference to FIG. 1, a system will be explained in which an electronic apparatus (client apparatus) according an embodiment causes an image of a catalog acquired from a server apparatus to be displayed on a screen of a television receiver. This electronic apparatus is a client apparatus 1 (hereinafter also referred to as a client) having a function of communicating with a server apparatus 2 (hereinafter also referred to as a server) through, e.g., a network. The client apparatus 1 can establish wireless connection, such as 3G mobile communication or wireless LAN, with the server apparatus 2, and execute wireless communication therewith. It should be noted that the client apparatus 1 may execute wired communication such as wired LAN with the server apparatus 2.

The client apparatus 1 has a housing formed in the shape of a thin box, and includes, at its left side surface, a video-apparatus connection terminal (not shown) compliant with, e.g., a high-definition multimedia interface (HDMI®) standard. The video-apparatus connection terminal is used in outputting a digital video signal to an external video device (e.g., an external display). The client apparatus 1 outputs a video signal to, e.g., a television receiver 3 which is HDMI-connected to the client apparatus 1. It should be noted that the client apparatus 1 may be formed in the shape of such a dongle as to be detachably connected to a video-apparatus connection terminal provided at the television receiver 3.

Also, the client apparatus 1 includes a Bluetooth® module in its housing. The Bluetooth module is applied to wireless communication (Bluetooth communication) with another electronic apparatus provided with a Bluetooth module. The client apparatus 1 receives, for example, from a remote control 4 which is Bluetooth-connected to the client apparatus 1, operation information (operation signal) on an operation using the remote control 4.

Upon receipt of operation information requesting displaying of an on-line catalog from the remote control 4, the client 1 requests the server 2 to transmit associated data. The on-line catalog is a catalog for, e.g., promoting sale of commodities. As the on-line catalog, various kinds of catalogs can be applied, such as an advertising bill and a leaflet. In addition, data on the catalog includes data on an image of one or more commodities and an image in which a text of various information such as a price, amount and size is written. The server 2 transmits data for displaying the catalog to the client 1 in response to a request made by the client 1.

The client 1 receives the data transmitted by the server 2, and generates a video signal, using the data. Then, the client 1 outputs the generated video signal to the television receiver 3. The television receiver 3 displays video (image) of the catalog on its screen, using the video signal output from the client 1.

A user can view the catalog displayed on the screen, and give an instruction for purchase of a commodity by operating the remote control 4. In addition, the user can give an instruction for enlarging part of the displayed catalog by operating the remote control 4.

As an operation for enlarging or reducing part of the catalog, an operation using, e.g., buttons for instructing movement from side to side and up and down and an OK button may be considered. In this case, the user sets an enlargement button or reduction button (button of GUI) of the catalog rendered on the screen in a selected state (that is, set it as an operation target) by pressing the buttons for instructing movement from side to side and up and down. Then, the user gives an instruction for enlarging or reducing the image rendered on the screen by pressing the OK button. Also, as the operation for enlarging or reducing part of the catalog, an operation for using the remote control as a pointing device for moving a cursor displayed on the screen may be considered. After directing the remote control to the screen, and performing an operation for moving the remote control to move the cursor displayed on the screen to the enlargement button or the reduction button, the user presses an OK button of the remote control to give an instruction for enlarging or reducing the catalog. By performing such an operation, an image in which part of the catalog is enlarged or reduced is displayed on the screen.

In such a manner, in order that the enlargement button or reduction button rendered on the screen be set in a selected state, the button for giving the instruction for movement from side to side and up and down is pressed, and the cursor is moved to the enlargement button or reduction button. However, in this case, the number of operations to be performed is large, and they may be troublesome for the user.

Thus, in the embodiment, the catalog displayed on the screen is divided into a plurality of areas, numbers are allocated to the plurality of areas, respectively, as a result of which when any of numeric buttons (e.g., numeric buttons "1" to "9") provided at the remote control 4 is pressed, an associated allocated area is enlarged and displayed. Thereby, the user has only to press a numeric button of the remote control 4 in order that an arbitrary area be enlargedly displayed; that is, the user can easily give an instruction. Therefore, the burden on an operation by the user can be reduced.

FIG. 2 shows an example of a system configuration of the client 1.

The client 1, as shown in FIG. 2, includes a CPU 101, a system controller 102, a main memory 103, a graphics controller 104, a BIOS-ROM 105, a nonvolatile memory 106, a wireless communication device 107, an embedded controller (EC) 108, a sound controller 109, an HDMI controller circuit 110, a Bluetooth (BT) module 111, etc.

The CPU 101 is a processor configured to control operations of various kinds of components in the client 1. The CPU 101 executes various kinds of software loaded into the main memory 103 from the nonvolatile memory 106, which is a storage device. Those software includes an operating system (OS) 103A and various application programs. The application programs include a catalog browser 103B, which has a display control function of controlling displaying of a catalog, an advertising bill, a leaflet, etc. The display control function may be implemented by processing circuitry. Example of the processing circuitry includes a programmed processor, as the CPU 101. Example of the processing circuitry also includes ASIC and one or more electronic circuits arranged to perform the display control function.

In addition, the CPU 101 executes a basic input output system (BIOS) stored in a BIOS-ROM 105. The BIOS is a program for controlling hardware.

The system controller 102 is a device which connects a local bus of the CPU 101 and various components. The system controller 102 incorporates therein a memory controller which access-controls the main memory 103. Furthermore, the system controller 102 has a function of executing communication with the graphics controller 104 through a serial bus compliant with a PCI EXPRESS standard or the like.

The graphics controller 104 transmits a digital video signal to an external display (e.g., the television receiver 3) through an HDMI control circuit 110 and an HDMI terminal 110A. The HDMI terminal 110A is the above video-apparatus connection terminal. The sound controller 109 transmits a digital audio signal to the external display through the HDMI control circuit 110 and the HDMI terminal 110A. The HDMI terminal 110A can transmit a digital video signal and a digital audio signal, which are not compressed, to the external display such as the television receiver 3 through a single cable. The HDMI control circuit 110 is an interface for transmitting a digital video signal and a digital audio signal to the external video device through the HDMI terminal 110A.

The wireless communication device 107 is a device configured to execute wireless communication such as 3G mobile communication or wireless LAN. The EC 108 is a one-chip microcomputer including an embedded controller for managing power. The EC 108 has a function of powering on or off the client 1 in accordance with an operation by a user on a power button.

The BT module 111 executes wireless communication compliant with a Bluetooth standard with a BT module provided at an external electronic device (e.g., the remote control 4). The BT module 111 receives operation information transmitted by, e.g., the remote control 4 in accordance with an operation using the remote control 4. When the remote control 4 detects that one of the buttons (keys)

provided on the remote control 4 is pressed, the remote control 4 transmits operation information associated with the above pressing operation to the BT module 111.

An example of a functional configuration of the catalog browser 103B to be executed by the client 1 will be explained with reference to FIG. 3. As described above, the catalog browser 103B controls displaying of an image corresponding to a catalog, an advertising bill, a leaflet, or the like. The catalog browser 103B can display an entire catalog or enlargedly display part of the catalog in accordance with an operation by the user using the remote control 4. The catalog browser 103B includes an operation information receiver 201, a data requesting module 202, a data receiver 203, a display controller 204, etc.

First, the operation information receiver 201 receives operation information from the remote control 4. As described above, for example, Bluetooth connection is established between the remote control 4 and the BT module 111 of the client 1. The operation information receiver 201 receives operation information regarding an operation using the remote control 4 through the BT module 111.

FIG. 4 shows an example of an appearance of the remote control 4, which is configured to transmit various operation information to the operation information receiver 201. When an operation button is pressed, the remote control 4 transmits operation information associated with the operation button. The remote control 4, as shown in FIG. 4, includes numeric buttons (numeric keys) "0" 400 to "9" 409, a cart button 411, a "return" button 412, etc.

The numeric button "0" 400 is an operation button for having an entire catalog displayed. The numeric buttons "1" 401 to "9" 409 are operation buttons for specifying areas of the catalog, respectively, which are to be enlarged when the catalog is viewed. The cart button 411 is an operation button for purchasing a commodity. The "return" button 412 is an operation button for returning an operation state to a previous operation state in an operation process. For example, in the case where the entire catalog is displayed, when an arbitrary area of the catalog is specified as an area to be enlargedly displayed, it is enlargedly displayed. In this state, the "return" button 412 is used to return the displayed state to a previous displayed state in which the entire catalog is displayed.

Figure 5:
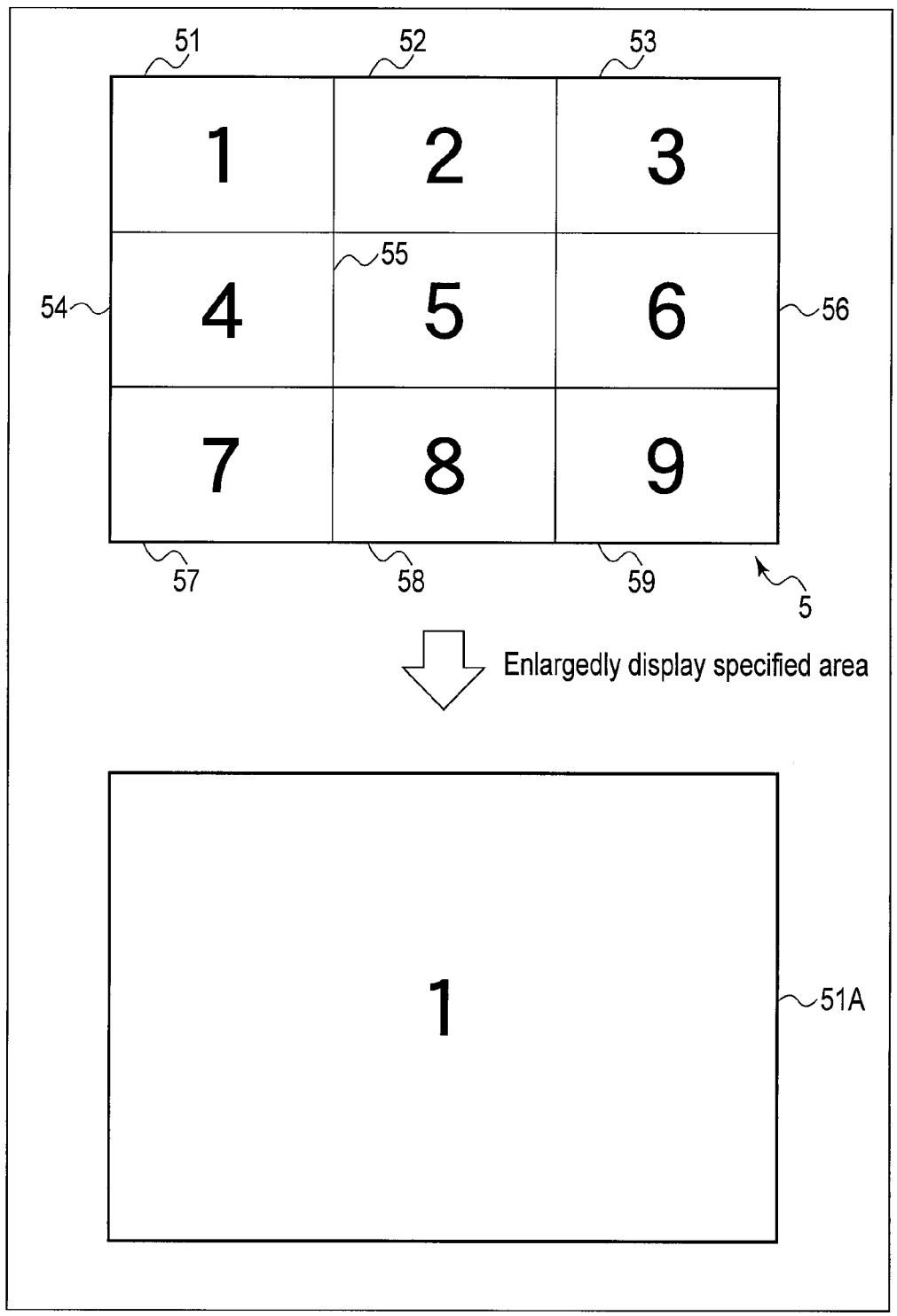
FIG. 5 is a view for explaining an example of the case where an area of a catalog, which is specified by a user, is enlarged and displayed by the electronic apparatus of the embodiment.

In an example shown in FIG. 5, it is shown in that a catalog (entire catalog) 5 displayed on a screen of the television receiver 3 is divided into nine areas 51 to 59. The nine areas 51 to 59, for example, are 3×3 divided areas having the same size. Furthermore, numbers (e.g., numbers "1" to "9") for identifying the areas 51 to 59 are allocated to these areas. That is, to the nine areas 51 to 59, the numeric buttons "1" 401 to "9" 409 on the remote control 4 are allocated.

If wishing to have an area in the entire catalog 5 enlargedly displayed, the user uses the remote control 4 to perform an operation for pressing one of the numeric buttons, whose number corresponds to the number allocated to the above area. For example, if wishing to have an area "1" 51 in the catalog enlargedly displayed, the user presses the button "1" 401 on the remote control 4. In accordance with this one-touch operation, an image 51A which corresponds to an enlarged displayed image of an area given the number of the pressed numeric button is displayed on the screen of the television receiver 3.

The remote control 4 transmits operation information associated with the pressed button to the client 1. For example, when the numeric button "0" 400 is pressed, the remote control 4 transmits operation information indicating that the numeric button "0" 400 is pressed to the client 1. In addition, when the numeric button "1" 401 is pressed, the remote control 4 transmits operation information indicating that the numeric button "1" 401 is pressed to the client 1.

The operation information receiver 201 of the client 1 receives the operation information transmitted by the remote control 4, and outputs the operation information to the data requesting module 202.

The data requesting module 202 requests the server 2 to transmit data necessary to display a screen image corresponding to the operation information. As described above, for example, wireless connection is established between the server 2 and the wireless communication device 107. Thus, through the wireless communication device 107, the data requesting module 202 requests the server 2 to transmit the necessary data.

To be more specific, when operation information indicating that e.g., the numeric button "0" 400 on the remote control 4 is pressed is received, the data requesting module 202 requests the server 2 to transmit catalog data for displaying the entire catalog 5. Also, when receiving operation information indicating that any of the numeric buttons "1" 401 to "9" 409 on the remote control 4 is pressed, the data requesting module 202 requests the server 2 to transmit catalog data for enlargedly displaying an area in the catalog 5, to which the pressed numeric button is allocated.

It is possible to change a relationship between the buttons on the remote control 4 (i.e., the operation information from the remote control 4) and the operation of the data requesting module 202, in accordance with, e.g., the number of areas into which the catalog 5 is divided for enlargedly displaying. For example, it is possible to provide a structure in which in the case where the catalog 5 is divided into 6 areas, in accordance with operation information indicating that any of the numeric buttons "1" 401 to "6" 406 on the remote control 4 is pressed, the data requesting module 202 requests the server 2 to transmit data, and in accordance with operation information indicating that any of the numeric buttons "7" 407 to "9" 409 is pressed, the data requesting module 202 does not request the server 2 to transmit data. That is, it can be changed as appropriate what operations are allocated to the buttons on the remote control 4.

The server 2 transmits catalog data in response to a request by the client 1. For example, if being requested to transmit catalog data for displaying an image of the entire catalog 5, the server 2 reads image data on the entire catalog from a catalog database 21, and generates catalog data for displaying the image of the entire catalog 5 on the screen. The server 2, for example, generates catalog data in an HTML format corresponding to a web page in which layout of the image of the entire catalog 5 is defined. It should be noted that the server 2 may generate catalog data for displaying on the screen, the image of the entire catalog 5 and an operation image indicating a relationship between areas set in the catalog 5 (which are divided areas to be enlargedly displayed) and the buttons on the remote control 4. The server 2, for example, generates catalog data in an HTML format corresponding to a web page in which layout of the image of the entire catalog 5 and the operation image is defined. The server 2 then transmits the generated catalog data to the client 1.

Furthermore, if being requested to transmit catalog data for enlargedly displaying, e.g., a first area in the catalog 5, the server 2 reads image data associated with the first area, from the catalog database 21. Then, the server 2 generates catalog data for displaying on the screen, an enlarged image of the first area (which will also hereinafter be referred to as an enlarged catalog image). The server 2, for example, generates catalog data in an HTML format corresponding to a web page in which layout of the enlarged catalog image is defined. It should be noted that the server 2 may generate catalog data for use in displaying on the screen the enlarged catalog image and the operation image indicating the relationship between the areas in the catalog 5 and the buttons on the remote control 4. The server 2, for example, generates catalog data in an HTML format corresponding to a web page in which layout of the enlarged catalog image and the operation image is defined. Then, the server 2 transmits the generated catalog data to the client 1.

It should be noted that the catalog data (HTML data) for displaying the image of the entire catalog 5 and the operation image, catalog data for displaying the enlarged catalog image and the operation image for each of the areas set in the catalog 5, etc. may be stored in advance in the catalog database 21 of the server 2. In this case, the server 2 reads catalog data corresponding to a request made by the client 1 from the catalog database 21, and transmits the catalog data to the client 1.

The data receiver 203 of the client 1 receives catalog data for displaying the catalog, which is transmitted by the server 2. The data receiver 203 receives data corresponding to a request made by the data requesting module 202, e.g., catalog data (first data) for displaying the entire catalog 5 or catalog data (second data) for enlargedly displaying the first area in the catalog 5. Then, the data receiver 203 outputs the received catalog data to the display controller 204.

The display controller 204 controls, using the catalog data, such that the catalog 5 is displayed on the screen of the television receiver 3. For example, the display controller 204 controls, using the catalog data (first data) for displaying the entire catalog 5, such that the entire catalog 5 is displayed on the screen of the television receiver 3. In addition, for example, the display controller 204 controls, using the catalog data (second data) for enlargedly displaying the first area in the catalog 5, such that the enlarged first area is displayed on the screen of the television receiver 3.

To be more specific, the display controller 204 generate a web page including the catalog (e.g., the image of the entire catalog 5 or enlarged catalog image) by analyzing the catalog data in the HTML format. Then, the display controller 204 generates a video signal for displaying the above web page on the screen of the television receiver 3. As disclosed above, between the television receiver 3 and the client 1, for example, HDMI connection is established. The display controller 204 outputs the video signal to the television receiver 3 through the HDMI control circuit 110 and the HDMI terminal 110A.

Thereby, when the entire catalog 5 is requested to be displayed (for example, when the numeric button "0" 400 on the remote control 4 is pressed), video including the image of the entire catalog 5 is displayed on the screen of the television receiver 3. Furthermore, when part of the catalog 5 is requested to be enlargedly displayed (for example, any of the numeric buttons "1" 401 to "9" 409 on the remote control 4 is pressed), video including an enlarged image of the part of the catalog 5 is displayed on the screen of the television receiver 3. It should be noted that the video to be displayed may include the operation image indicating the relationship between the areas in the catalog 5 and the buttons on the remote control 4.

By virtue of the above structure, an arbitrary area in the catalog 5 can be enlargedly displayed simply by performing a one-touch operation in which one of the numeric buttons on the remote control 4 is pressed, thus reducing the burden on the operation using the remote control 4.

It is conceivable that the catalog 5 is an image obtained by digitizing an advertising bill to be distributed as printed paper. In such a catalog 5, there is a case where areas having different sizes are allocated to commodities or areas for commodities are unclearly defined. In addition, there is a case where in order to design advertisements, layout of commodities is complicated or text is written over a plurality of areas for commodities.

Therefore, in the embodiment, it may be set that in the case where any of the areas 51 to 59 in the catalog 5 is enlargedly displayed, its peripheral area (second area) is also enlargedly displayed to ensure that information on a commodity indicated in the vicinity of a boundary between areas is also completely displayed without dropping out.

Figure 6:
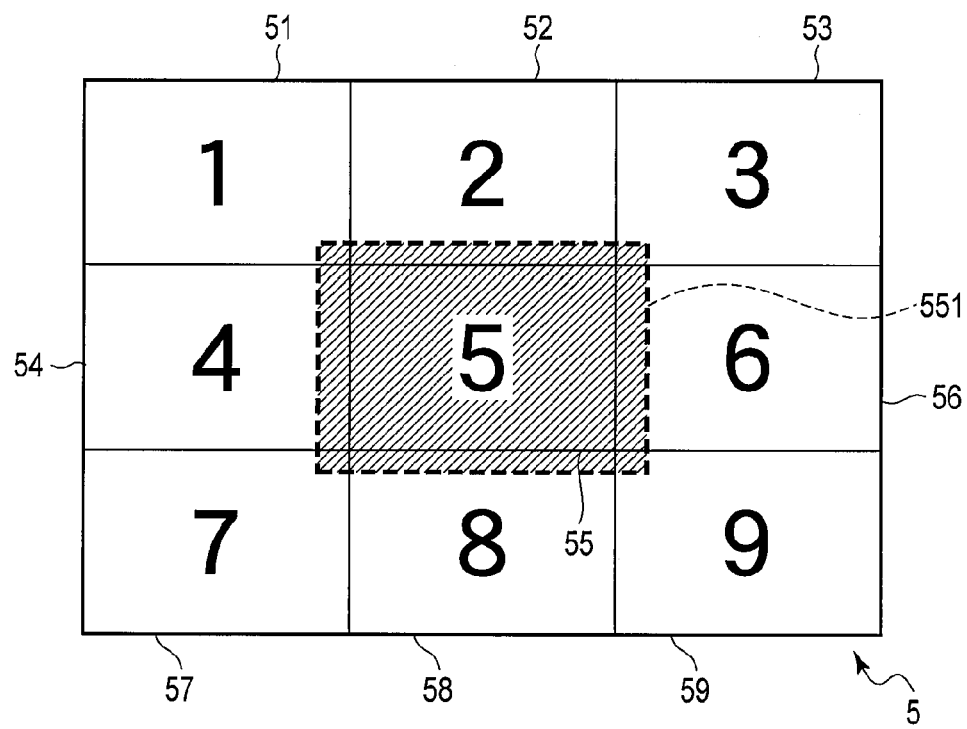
FIG. 6 is a view showing an example of an area of the catalog, which is enlarged and displayed by the electronic apparatus of the embodiment.
Figure 7:
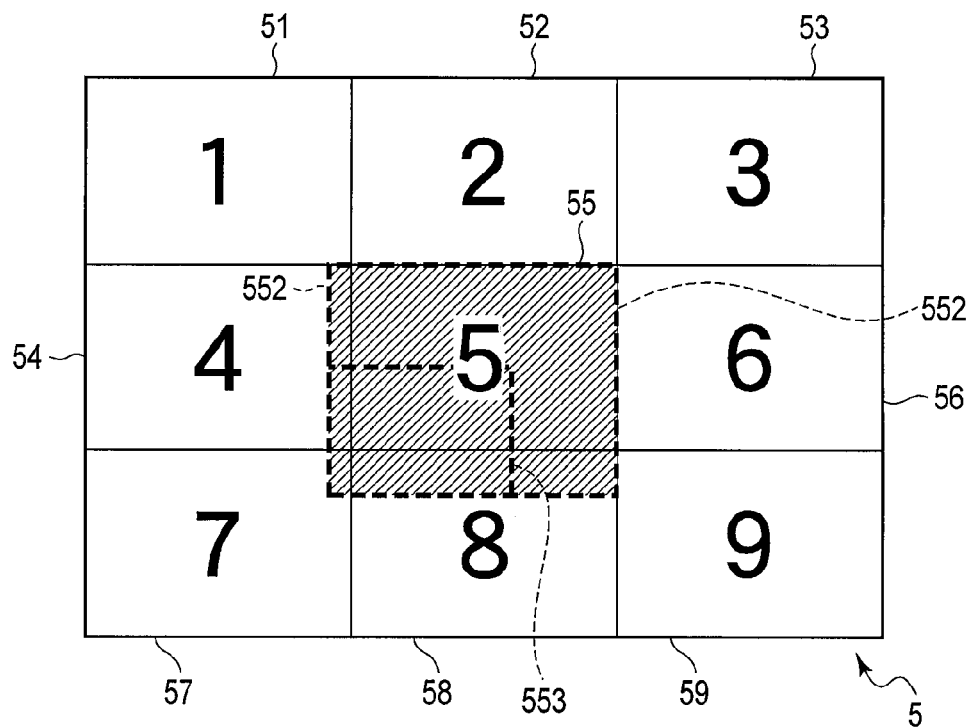
FIG. 7 is a view showing another example of the area of the catalog, which is enlarged and displayed by the electronic apparatus of the embodiment.

FIGS. 6 and 7 show examples in each of which a margin area is added to each of the areas 51 to 59 in the catalog 5 as an area neighboring each area.

In the example shown in FIG. 6, a margin area 551, which surrounds the area "5" 55, is added to the area "5" 55. The margin area 551, for example, is an area having a predetermined size. In this case, for example, in response to an instruction to enlargedly display the area "5" 55 (i.e., upon receipt of operation information indicating that the numeric button "5" 405 is pressed, which is sent from the remote control 4), the data receiver 203 receives from the server 2, catalog data for use in enlargedly displaying the area "5" 55 and the margin area 551. The display controller 204 controls, using the received catalog data, such that the area "5" 55 and the margin area 551 are enlargedly displayed on the screen. In such a manner, a neighboring margin area is added to each of the areas 51 to 59, thereby enabling a photograph, a picture, a character, etc. existing near a boundary of each area to be easily viewed.

In the example shown in FIG. 7, in consideration of an object (area) 553 rendered in the catalog 5, a margin area 552 is added to the area "5" 55. To be more specific, if part of the object 553 (first object) is included in the area "5" 55, the margin area 552 is set to include the remaining part of the object 553. That is, the margin area 552 is added such that the object 553 is covered by the area "5" 55 and the margin area 552.

The object 553 is determined by a boundary based on a cluster such as a photograph, a picture, a character, etc. rendered in the catalog 5. Such an object in the catalog 5 is detected by subjecting the catalog 5 to predetermined image processing (e.g., edge detection processing). In such a manner, since the margin area 552 is added to the area "5" 55, a cluster such as a photograph, a picture, a character, etc., which is partially included in the area "5" 55, can be completely displayed without dropping out.

Figure 8:
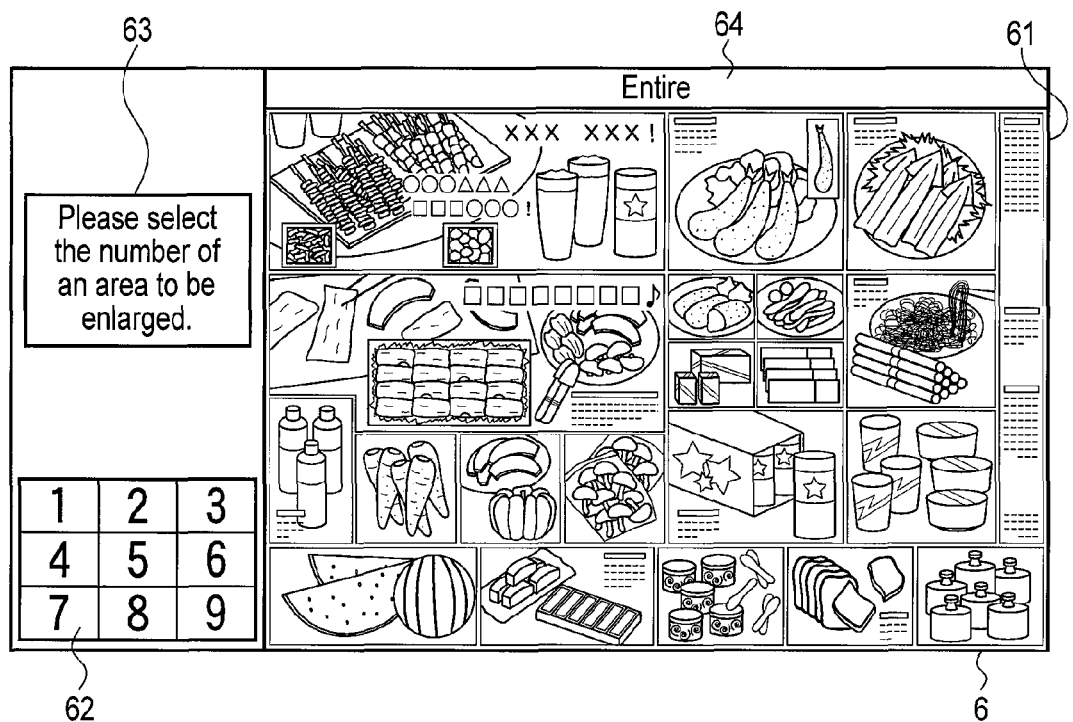
FIG. 8 is a view showing an example of a screen including an entire catalog, which is displayed by the electronic apparatus of the embodiment.
Figure 9:
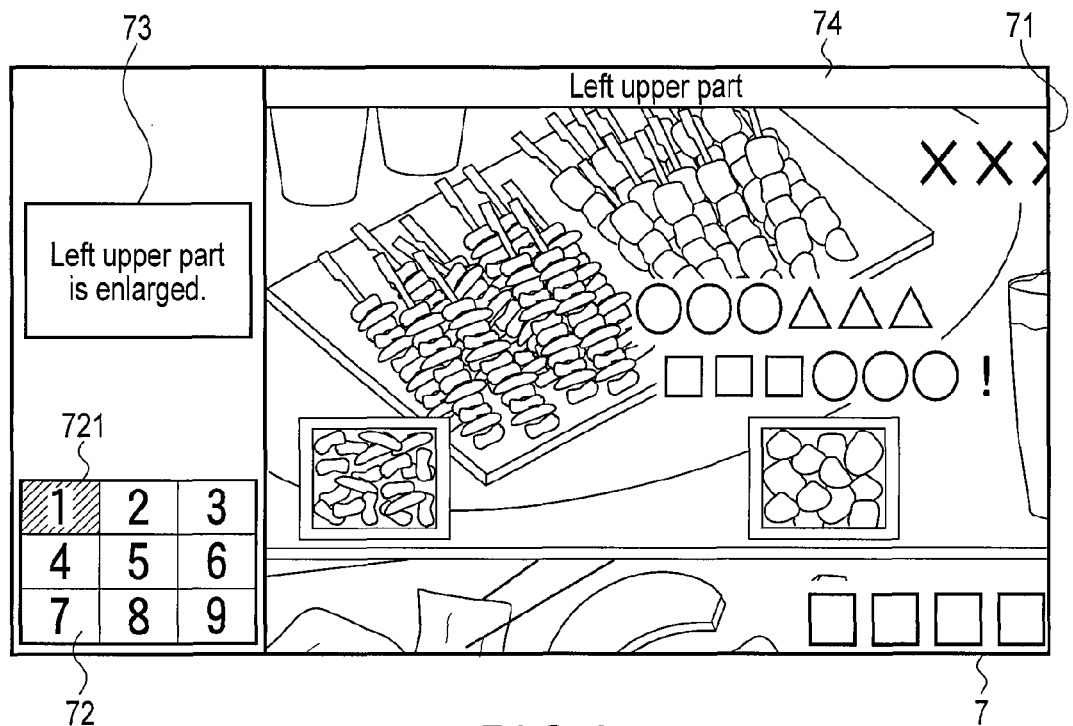
FIG. 9 is a view showing an example of a screen including an area in the catalog, which is specified by a user and enlarged and displayed by the electronic apparatus of the embodiment.
Figure 10:
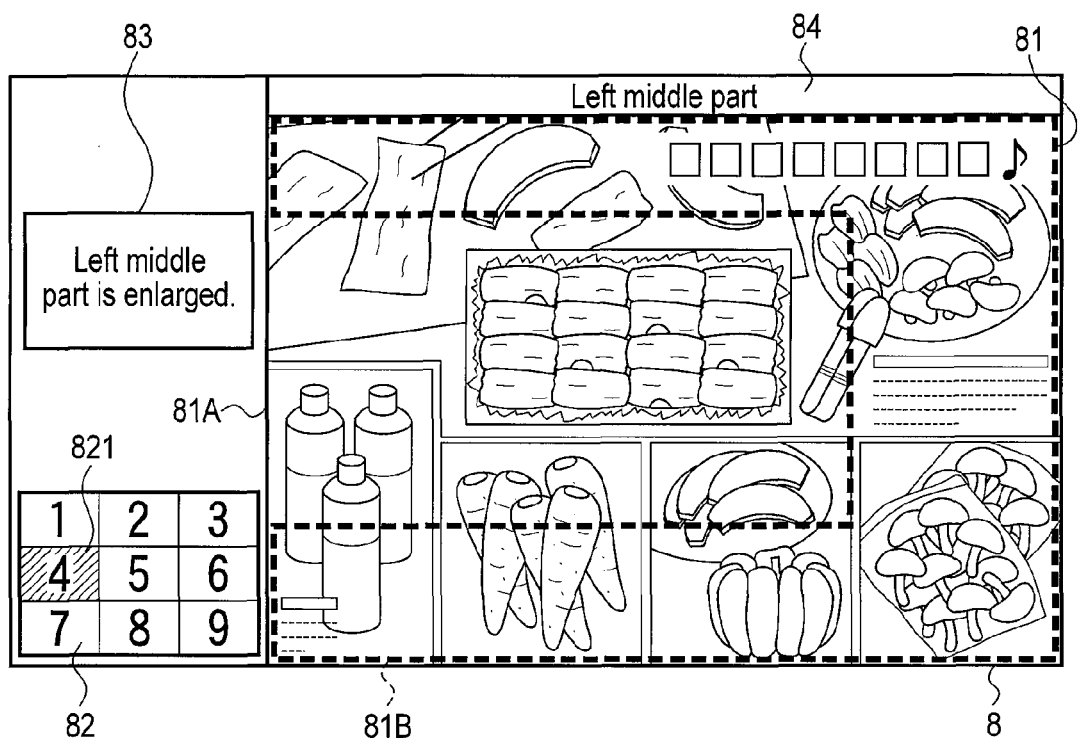
FIG. 10 is a view showing an example of a screen including another area in the catalog, which is specified by a user and enlarged and displayed by the electronic apparatus of the embodiment.

FIGS. 8 to 10 show examples of images displayed on the screen of the television receiver 3.

FIG. 8 shows an example of a screen image including an entire catalog. To be more specific, as shown in FIG. 8, a screen image 6 includes a catalog 61, an operation image 62, a message 63, and a status bar 64. The catalog 61 is an image of an entire catalog. The operation image 62 is an image indicating a relationship between a plurality of divided areas set in the catalog (which are 3×3 areas in this example) and numbers respectively allocated to the areas.

By viewing the operation image 62, the user recognizes which number is allocated to an area including a portion which the user wishes to enlarge. Therefore, by pressing a numeric button associated with an area to be enlarged, using the remote control 4, the user can give an instruction to enlargedly display the area.

In the message 63, the text information "Please select the number of an area to be enlarged." is displayed as information for explaining an operation. In the status bar 64, the text information "entire" is displayed as information for explaining that the entire catalog is displayed.

As shown in FIG. 9, when the numeric button "1" 401 is pressed, an image 71 is displayed in which an area "1" in the entire catalog 61 (which is an upper left one of 3×3 divided areas of the entire catalog 61 in the example) is enlarged. In an operation image 72, in order to indicate that the area "1" is enlargedly displayed, a portion 721 corresponding to the area "1" is displayed in a different manner from those of the other portions. For example, the portion 721 corresponding to the area "1" is displayed in brightness, color, transparency, etc. which are different from those of the other portions. Furthermore, in a message 73, the text information "Left upper part is enlarged." is displayed as information for explaining enlarged part. In addition, in the status bar 74, the text information "left upper part" is displayed to explain the enlarged part.

FIG. 10 shows an example in which when the numeric button "4" 404 is pressed, an image 81 is displayed in which an area "4" 81A (corresponding to an area located on the left side in a middle stage in the example) is enlargedly displayed along with a margin area 81B added to the area "4" 81A. In consideration of clusters such as a photograph, a picture, a character, etc in the area "4" 81A, the margin area 81B is added to the area "4" 81A such that clusters of the photograph, the picture, the character, etc. are completely displayed without dropping out. The margin area 81B may be determined such that an area including the area "4" 81A and the margin area 81B is provided in a predetermined shape (e.g., as a rectangular area or a rectangular area having a predetermined aspect ratio).

In an operation image 82, in order to indicate that an area "4" is enlargedly displayed, a portion 821 corresponding to the area "4" is displayed in a different manner from those of the other portions. For example, the portion 821 corresponding to the area "4" is displayed in brightness, color, transparency, etc. which are different from those of the other portions. In a message 83, the text information "Left middle part is enlarged." is displayed as information for explaining the enlarged area. Furthermore, in the status bar 84, the text information "Left middle part" is displayed to explain the enlarged area.

Figure 11:
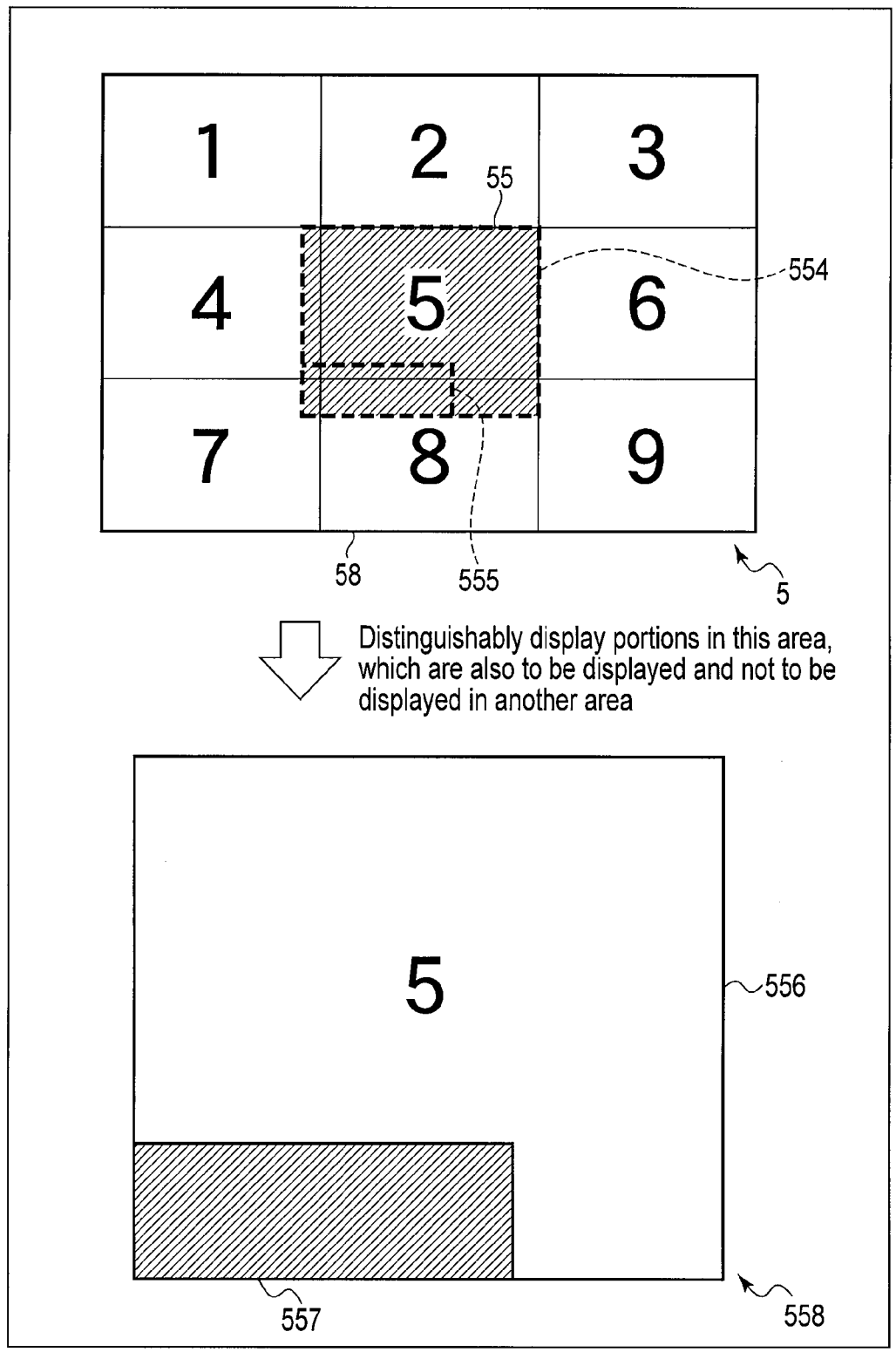
FIG. 11 is a view for explaining an example of the case where a display manner of an area of a catalog, which is enlarged and displayed, is controlled by the electronic apparatus of the embodiment.

FIG. 11 shows an example in which in the case where the area "5" 554 in the catalog 5 is enlargedly displayed, first and second portions in the area "5" 554 are distinguishably displayed. The area "5" 554 includes an area 555 corresponding to a cluster of a photograph, a picture, a character, etc. That is, the area "5" 554 includes a margin area set based on the area 555.

As shown in FIG. 11, the greater part of the area 555 is included in an area "8" 58. Thus, when the area "8" 58 is instructed to be enlargedly displayed, the area 555 may also be enlargedly displayed on the screen. Therefore, in the case of instructing the area "5" 554 to be enlargedly displayed, the user may take little interest in the area 555. Thus, when an image 558 in which the area "5" 554 is enlarged is displayed on the screen, a portion 557 corresponding to the area 555 is displayed distinguishable from the other portion, i.e., a portion 556. The portion 557 corresponding to the area 555 is displayed in a different manner from the portion 556 in, e.g., brightness, color, transparency, resolution, etc. For example, the portion 557 corresponding to the area 555 is more darkly displayed than the portion 556.

Figure 12:
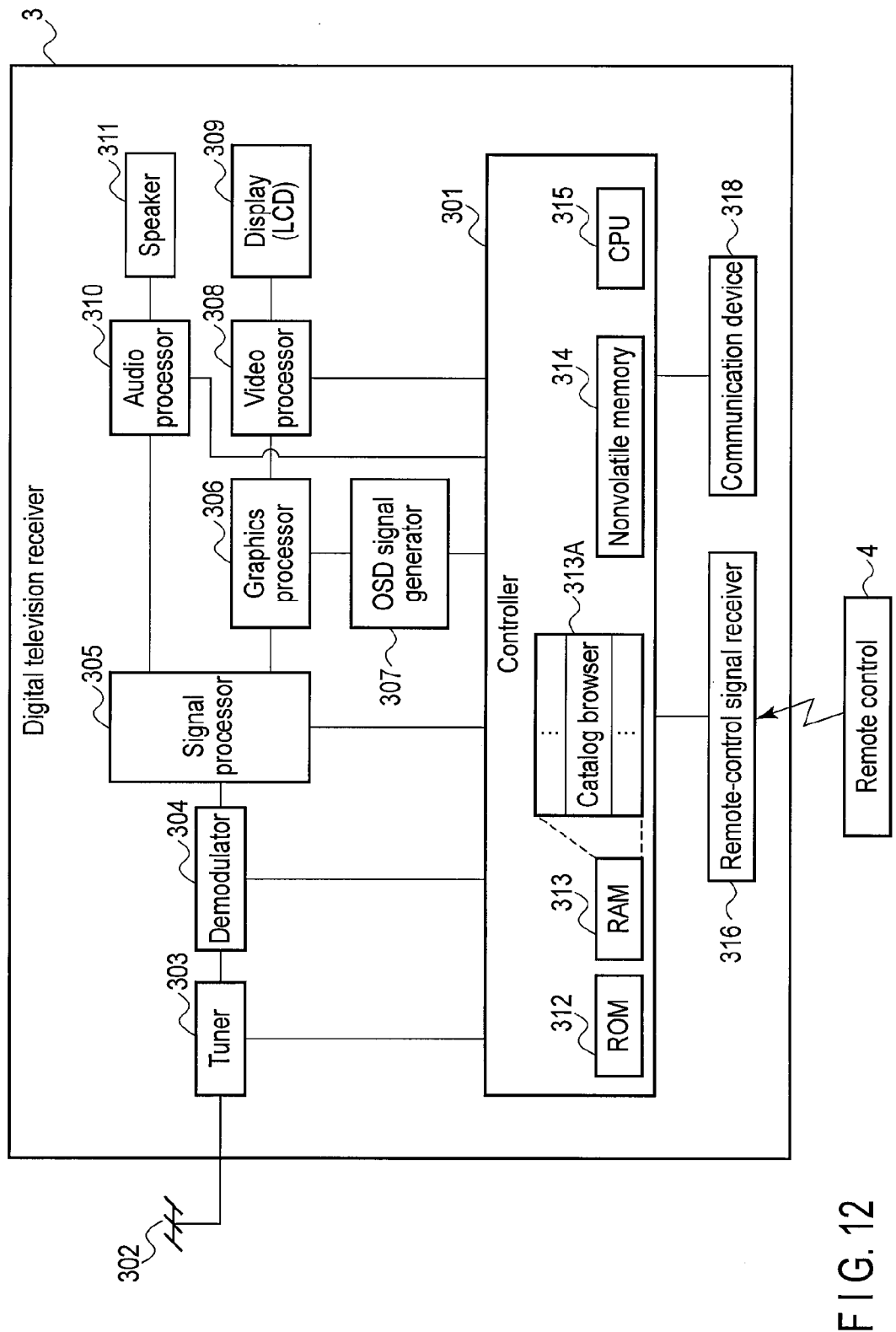
FIG. 12 is a block diagram showing another example of the system configuration of the electronic apparatus of the embodiment.

FIG. 12 shows an example of a system configuration of a television receiver 3 made to have the above function of the client 1.

The television receiver 3 includes a controller 301, a tuner 303, a demodulator 304, a signal processor 305, a graphics processor 306, an OSD signal generator 307, a video processor 308, a display (LCD) 309, an audio processor 310, a speaker 311, a remote-control signal receiver 316, a communication device 318, etc.

The controller 301 controls operations of components in a digital television receiver 3. The controller 301 includes a ROM 312, a RAM 313, a nonvolatile memory 314, and a CPU 315. The ROM 312 stores a control program, various application programs, etc., which are executed by the CPU 315. The nonvolatile memory 314 stores various set information and control information. The CPU 315 loads instructions and data necessary for processing into the RAM 313, and executes processing.

A broadcast signal receiving antenna 302 receives digital television broadcast signals (e.g., digital terrestrial television broadcast signals or satellite digital broadcast signals). The broadcast signal receiving antenna 302 outputs the received digital television broadcast signals to the tuner 303 through an input terminal. The tuner 303 tunes in to a channel of a broadcast signal which is selected from among the broadcast signals by the user. The tuner 303 outputs the selected broadcast signal to the demodulator 304 (e.g., an orthogonal frequency division multiplexing (OFDM) demodulator or a phase shift keying (PSK) demodulator). The demodulator 304 demodulates the selected broadcast signal to generate a digital video signal and a digital audio signal. The demodulator 304 outputs the generated digital video and audio signal to the signal processor 305.

The signal processor 305 subjects the digital video and audio signals output by the demodulator 304 to predetermined digital signal processing. The signal processor 305 outputs the video and audio signals subjected to the predetermined digital signal processing to the graphics processor 306 and the audio processor 310.

The audio processor 310 converts the digital audio signal into an analog audio signal which can be reproduced by the speaker 311. The audio processor 310 outputs the analog audio signal to the speaker 311. The speaker 311 reproduces sound based on the analog audio signal.

The graphics processor 306 superimposes an on-screen display (OSD) signal such as a menu which is generated by an OSD signal generator 307, on the digital video signal output from the signal processor 305. The graphics processor 306 outputs the video signal on which the OSD signal is superimposed, to the video processor 308. In addition, the graphics processor 306 may output either the video signal output from the signal processor 305 or the OSD signal output from the OSD signal generator 307.

The video processor 308 subjects the digital video signal to predetermined processing. Furthermore, the video processor 308 converts the digital video signal subjected to the predetermined processing into an analog video signal which can be displayed by the display 309. The video processor 308 then output the analog video signal to the display 309. The display 309 displays video based on the analog video signal.

The communication device 318 is a device configured to execute wireless communication such as 3G mobile communication or wireless LAN, wired communication such as LAN, etc.

The remote-control signal receiver 316 receives a remote-control signal transmitted by the remote control 4 (e.g., a signal of infrared radiation). Then, the remote-control signal receiver 316 outputs the received remote-control signal to the controller 301.

As described above, the ROM 312 stores various application programs. The application programs includes, e.g., a catalog browser 313A. The catalog browser 313A has the same functional configuration as the catalog browser 103B executed on the client 1. Therefore, the CPU 315 executes the catalog browser 313A loaded into the RAM 313, and can thereby control displaying of a catalog (for example, can have an area in the catalog enlargedly displayed) in accordance with an operation on the television receiver 3, using the remote control 4. That is, by virtue of such a structure, the television receiver 3 generates a video signal for displaying an entire catalog, and displays video including the entire catalog on the screen of the display 309, using the generated video signal. Furthermore, the television receiver 3 generates a video signal for enlargedly displaying a specified area in the catalog, displays video including an enlarged image of the area on the screen of the display 309.

Figure 13:
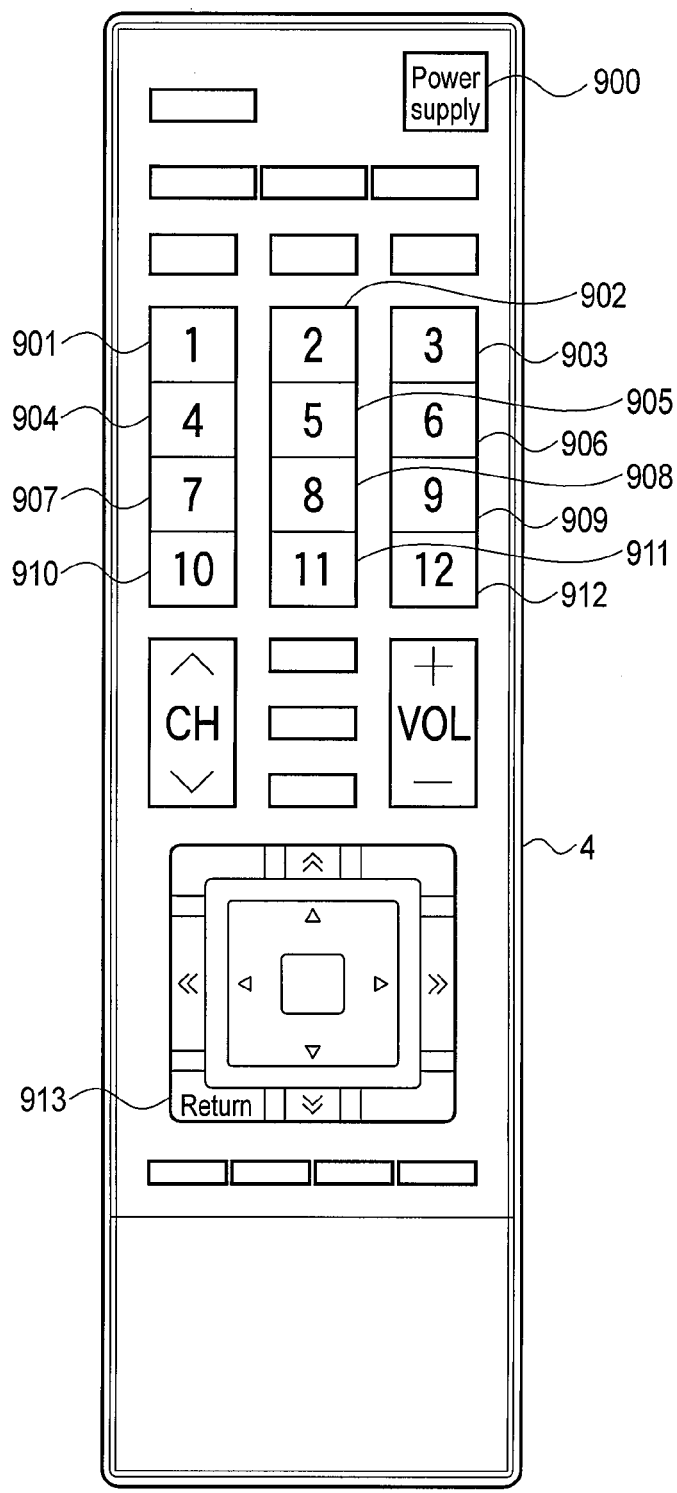
FIG. 13 is a view showing another example of the appearance of the remote control for operating the electronic apparatus of the embodiment.

FIG. 13 shows an example of the remote control 4, which transmits various remote-control signals to the remote-control signal receiver 316 of the television receiver 3. The remote control 4 transmits, when an operation button is pressed, a remote-control signal (operation information) associated with the operation button. As shown in FIG. 13, the remote control 4 includes a "power" button 900, numeric buttons (numeric keys) "1" 901 to "12" 912, a "return" button 913, etc.

The power button 900 is an operation button for effecting switching between a power-on state (operation state) and a power-off state (standby state) of the television receiver 3. In the case where a broadcasting program is viewed, the numeric buttons "1" 901 to "12" 912 are used as operation buttons for selecting channels, respectively, which are provided for broadcasting programs to be viewed. In the case where a catalog is viewed, the numeric buttons "1" 901 to "9" 909 are used as operation buttons for specifying areas in the catalog, respectively, which are to be enlarged. In addition, in the case where the catalog is viewed, the numeric button "10" 910 is used as an operation button for having the entire of the catalog displayed. The "return" button 913 is an operation button for returning the operation state to a previous operation state in an operation process. For example, in the case where the entire catalog is displayed, after an arbitrary area in the catalog is enlargedly displayed in response to an operation for specifying the arbitrary area in the catalog, the "return" button 913 is used to return the displayed state to a previous displayed state in which the entire catalog is displayed.

Then, with reference to a flowchart of FIG. 14, the procedure of display control processing will be explained, which is executed by the client 1 (or the television receiver 3 made to have the function of the client 1).

First, the data requesting module 202 of the client 1 determines whether a catalog is requested to be displayed (block B11). For example, if the operation information receiver 201 receives predetermined operation information from the remote control 4, the data requesting module 202 determines that a catalog is requested to be displayed. The predetermined operation information is operation information indicating that for example, the numeric button "0" 400 on the remote control 4 is pressed. If a catalog is not requested to be displayed (No in block B11), the process is returned to the block B11, and it is re-determined whether a catalog is requested to be displayed. On the other hand, if a catalog is requested to be displayed (Yes in block B11), the data requesting module 202 requests the server 2 to send catalog data (block B12).

The server 2 transmits catalog data to the client 1 in response to a request from the client 1 (block B13). The server 2, for example, reads image data on the entire catalog from the catalog database 21. Then, the server 2 generates data (e.g., HTML data) for displaying on the screen, an image of the entire catalog and an operation image indicative of a relationship between a plurality of areas set in the catalog and the buttons on the remote control 4; and transmits the data to the client 1. It should be noted that in the catalog database 21 of the server 2, data for displaying the image of the catalog and the operation image on the screen may be stored in advance. In this case, the server 2 reads data according to the request made by the client 1 from the catalog database 21, and transmits the data to the client 1.

The data receiver 203 of the client 1 receives the catalog data transmitted from the server 2 (block B14). Then, using the received data, the display controller 204 controls the catalog to be displayed on the screen of the television receiver 3 (block B15). To be more specific, if HTML data from the server 2 is received, the display controller 204 analyzes the HTML data to generate a web page. Then, the display controller 204 generates a video signal for displaying the web page on the screen of the television receiver 3, and outputs the video signal to the television receiver 3. Thereby, on the screen of the television receiver 3, video including the image of the entire catalog and the operation image is displayed.

Then, the data requesting module 202 determines whether any of the numeric keys (buttons) "1" 401 to 409 "9" is pressed (block B16). That is, the data requesting module 202 determines whether the operation information receiver 201 receives from the remote control 4, operation information indicating that any of the numeric keys "1" 401 to 409 "9" is pressed. If any of the numeric keys "1" 401 to 409 "9" is pressed (Yes in block B16), the data requesting module 202 requests transmission of data (enlargement catalog data) for enlargedly displaying an area associated with the pressed numeric key (block B17). The data requesting module 202 requests transmission of the enlargement catalog data by sending information indicating an area to be enlargedly displayed (e.g., a number identifying the area).

The server 2 transmits enlargement catalog data in response to a request from the client 1 (block B18). The server 2, for example, reads image data on an area to be enlarged, from the catalog database 21. Then, the server generates data (e.g., HTML data) for displaying on the screen, an enlarged image of the area and an operation image indicative of a relationship between the areas set in the catalog and the buttons on the remote control 4; and transmits the data. In the operation image, for example, a portion corresponding to the area to be enlarged is rendered distinguishable from a portion corresponding to the other areas. It should be noted that the data for displaying the enlarged image of the area and the operation image on the screen is stored in advance in the catalog database 21 of the server 2. In this case, the server 2 reads data corresponding to the request from the client 1, from the catalog database 21, and transmits the data to the client 1.

The data receiver 203 of the client 1 receives the enlargement catalog data transmitted from the server 2 (block B19). Then, using the received data, the display controller 204 controls the enlarged area in the catalog to be displayed on the screen of the television receiver 3 (block B20). To be more specific, if HTML data from the server 2 is received, the display controller 204 analyzes the HTML data to generate a web page. Then, the display controller 204 generates a video signal for displaying the web page on the screen of the television receiver 3, and outputs the video signal to the television receiver 3. Therefore, on the screen of the television receiver 3, video is displayed which includes the operation image and the enlarged image of the area associated with the pressed one of the numeric keys "1" 401 to 409 "9".

Furthermore, if none of the numeric keys "1" 401 to 409 "9" is pressed (No in block B19), the data requesting module 202 determines whether the numeric key "0" 400 is pressed (block B21). That is, the data requesting module 202 determines whether the operation information receiver 201 receives from the remote control 4, operation information indicating that the numeric keys "0" 400 is pressed. If the numeric keys "0" 400 is pressed (Yes in block B21), the process is returned to block B12, and processing for displaying the entire catalog on the screen of the television receiver 3 is executed. If the numeric keys "0" 400 is not pressed (No in block B21), the process is returned to block B16, and processing corresponding to a new operation of pressing the numeric keys 400 to 409 is executed.

As explained above, according to the embodiment, the burden on the operation using the remote control 4 can be reduced. The data receiver 203 receives first data for displaying the image of the catalog 5 (entire catalog). Using the first data, the display controller 204 controls the catalog 5 to be displayed on the screen of the television receiver 3. The operation information receiver 201 receives operation information indicating that one of the numeric buttons 401 to 409 on the remote control 4 is pressed. Based on the operation information, the display controller 204 controls an enlarged image of a first area of the divided areas 51 to 59 in the catalog 5 to be displayed on the screen.

By virtue of the above structure, an arbitrary area in the catalog 5 is enlargedly displayed simply by performing a one-touch operation in which one of the numeric buttons on the remote control 4 is pressed, thus reducing the burden on the operation using the remote control 4.

It should be noted that all processes of the display control processing according to the embodiment can be executed by software. Therefore, an advantage equivalent to that of the embodiment can be easily obtained simply by executing a program for executing the processes of the display control processing, after installing it on an ordinary computer through a computer-readable storage medium storing the program.

Each of the functions of the embodiments may be implemented by processing circuitry.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a data receiver to receive first data for displaying an image;
   processing circuitry to display, using the first data, the image on a screen of a display, the image divided into a plurality of areas; and
   an operation information receiver to receive operation information indicative of a selection of a first button of a plurality of buttons at a remote control, the plurality of buttons associated with the plurality of areas, respectively, the first button being associated with a first area of the plurality of areas,
   wherein the processing circuitry generates a first image and a second image and displays the first image and the second image which are enlarged on the screen, when the first button is pressed, the first image corresponding to the first area associated with the first button, the second image corresponding to a margin area which comprises at least a part of a peripheral area of the first area.

2. The electronic apparatus of claim 1, wherein
   when the operation information of the first button is received, the processing circuitry generates, using the operation information, an enlarged video signal for displaying the first image and the second image on the screen and outputs the enlarged video signal to the display.

3. The electronic apparatus of claim 1, wherein the margin area is an area surrounding the first area.

4. The electronic apparatus of claim 1, wherein when the first area comprises a part of a first object rendered on the image, the margin area comprises a remaining part of the first object.

5. The electronic apparatus of claim 1, wherein the first data comprises data of an HTML format.

6. The electronic apparatus of claim 1, wherein the first data further comprises data for displaying a third image indicative of a relationship between the plurality of areas and the plurality of buttons.

7. A display control method comprising:
   receiving first data for displaying an image;
   displaying, using the first data, the image on a screen of a display, the image divided into a plurality of areas;
   receiving operation information indicative of a selection of a first button of a plurality of buttons at a remote control, the plurality of buttons associated with the plurality of areas, respectively, the first button being associated with a first area of the plurality of areas; and
   generating a first image and a second image and displaying the first image and the second image which are enlarged on the screen when the first button is pressed the first image corresponding to the first area associated with the first button, the second image corresponding to a margin area which comprises at least a part of a peripheral area of the first area.

8. A computer-readable, non-transitory storage medium having stored thereon a program which is executable by a computer, the program controlling the computer to execute functions of:
   receiving first data for displaying an image;
   displaying, using the first data, the image on a screen of a display, the image divided into a plurality of areas;

receiving operation information indicative of a selection of a first button of a plurality of buttons at a remote control, the plurality of buttons associated with the plurality of areas, respectively, the first button being associated with a first area of the plurality of areas; and generating a first image and a second image and displaying the first image and the second image which are enlarged on the screen, when the first button is pressed, the first image corresponding to the first area associated with the first button, the second image corresponding to a margin area which comprises at least a part of a peripheral area of the first area.

* * * * *